US010539788B2

(12) United States Patent
Shrubsole et al.

(10) Patent No.: US 10,539,788 B2
(45) Date of Patent: Jan. 21, 2020

(54) SYSTEM, METHOD AND COMPUTER PROGRAM FOR HANDS-FREE CONFIGURATION OF A LUMINOUS DISTRIBUTION

(71) Applicant: SIGNIFY HOLDING B.V., Eindhoven (NL)

(72) Inventors: Paul Anthony Shrubsole, Arnhem (NL); Luca Tiberi, Eindhoven (NL); Maurice Herman Johan Draaijer, Ittervoort (NL); Ralf Gertruda Hubertus Voncken, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 81 days.

(21) Appl. No.: 15/518,322

(22) PCT Filed: Oct. 19, 2015

(86) PCT No.: PCT/EP2015/074075
§ 371 (c)(1),
(2) Date: Apr. 11, 2017

(87) PCT Pub. No.: WO2016/062642
PCT Pub. Date: Apr. 28, 2016

(65) Prior Publication Data
US 2017/0307880 A1 Oct. 26, 2017

(30) Foreign Application Priority Data

Oct. 21, 2014 (EP) ..................................... 14189768

(51) Int. Cl.
*G02B 27/00* (2006.01)
*G02C 11/04* (2006.01)
(Continued)

(52) U.S. Cl.
CPC ....... *G02B 27/0093* (2013.01); *G02B 27/017* (2013.01); *G02C 11/04* (2013.01); *G06F 3/013* (2013.01)

(58) Field of Classification Search
CPC .............. G02B 27/0093; G02B 27/017; G02B 23/125; G02B 2027/0178; G06F 3/013; G02C 11/04; G02C 11/10; F21V 33/0004
See application file for complete search history.

(56) References Cited

U.S. PATENT DOCUMENTS 7,401,920 B1 7/2008 Kranz et al.
2001/0021108 A1* 9/2001 Shimada ................. F21L 15/14
362/103
(Continued)

FOREIGN PATENT DOCUMENTS

CN 101038074 A 9/2007
EP 1134491 A2 9/2001
(Continued)

*Primary Examiner* — Jonathan A Boyd
(74) *Attorney, Agent, or Firm* — Akarsh P. Belagodu

(57) ABSTRACT

Disclosed is a system (100) comprising a head-mountable eye tracking sensor (116), a processor (110) coupled to said eye tracking sensor and at least one light source (120, 20') under control of said processor, wherein the at least one light source is arranged to generate a configurable luminous distribution (10, 20) into a field of view of the wearer of the eye tracking sensor; and the processor is adapted to configure said luminous distribution in response to eye tracking data obtained from said eye tracking sensor. A method of controlling such a system and a computer program product for implementing such a method are also disclosed.

11 Claims, 4 Drawing Sheets

(51) Int. Cl.
*G06F 3/01* (2006.01)
*G02B 27/01* (2006.01)

(56) References Cited

U.S. PATENT DOCUMENTS

| | | | |
|---|---|---|---|
| 2010/0176732 A1* | 7/2010 | Schenk | H05B 33/0803 |
| | | | 315/312 |
| 2011/0221656 A1 | 9/2011 | Haddick et al. | |
| 2013/0063486 A1 | 3/2013 | Braun et al. | |
| 2013/0293722 A1* | 11/2013 | Chen | F21V 14/02 |
| | | | 348/164 |
| 2013/0310652 A1* | 11/2013 | Barsoum | A61B 90/30 |
| | | | 600/249 |
| 2014/0039273 A1 | 2/2014 | Kim et al. | |

FOREIGN PATENT DOCUMENTS

| | | |
|---|---|---|
| JP | 2002150803 A | 5/2002 |
| JP | 2009073284 A | 4/2009 |
| WO | 2011106798 A1 | 9/2011 |
| WO | 2012172383 A1 | 12/2012 |
| WO | 2014037953 A2 | 3/2014 |
| WO | 2014/074871 A1 | 5/2014 |
| WO | 2014/138380 A1 | 9/2014 |

* cited by examiner

SYSTEM, METHOD AND COMPUTER PROGRAM FOR HANDS-FREE CONFIGURATION OF A LUMINOUS DISTRIBUTION

CROSS-REFERENCE TO PRIOR APPLICATIONS

This application is the U.S. National Phase application under 35 U.S.C. § 371 of International Application No. PCT/EP2015/074075, filed on Oct. 19, 2015, which claims the benefit of European Patent Application No. 14189768.6, filed on Oct. 21, 2014. These applications are hereby incorporated by reference herein.

FIELD OF THE INVENTION

The present invention relates to a system for hands-free configuration of a luminous distribution.

The present invention further relates to a method of controlling such a system.

The present invention yet further relates to a computer program product for implementing such a method when executed on a processor of such a system.

BACKGROUND OF THE INVENTION

In a variety of professional fields, low illumination is a given, while these professionals still need to identify particular locations, navigate to these locations and perform operations related to their roles. This can apply for instance to building maintenance operators and installers of systems such as lighting systems. Other fields include fire rescue, police surveillance, power-outage repairs, search and rescue, night time photography, and so on. Usually, these professionals require the use of both of their hands to complete their tasks, and therefore cannot use or hold portable light sources.

For instance, for lighting maintenance professionals, this entails locating cables, switches, sensors, connectors, power points above the ceiling tiles, followed by performing manual tasks at one or more of these locations to repair or replace a faulty device or cable. Currently these professionals are typically provided with lanterns, torches, head-mounted light sources to perform these tasks. The latter class of illumination device helps to provide directed light whilst allowing for hands-free control. However, it is not adaptive to the changing tasks of the worker within the low light conditions. For this, full control over the amount and shape of light in an area is needed to support their tasks, in particular to switch seamlessly between scanning for areas of attention and performing localized tasks in said areas of attention where directed, local lighting is needed in a hands-free manner.

Wearable smart devices such as smart glasses with see-through displays are currently entering the market. An example of such a device is provided in US 2013/0063486 A1. In the professional domain, applications are foreseen that can enhance productivity and worker safety when performing cumbersome manual tasks in the field. One challenge and opportunity in this space is the provisioning of intuitive (hands-free) control of light in low-light conditions where external light sources are not readily available, e.g. office false ceilings, fire rescue situations, low light surveillance in a vehicle such as a helicopter, and so on, and where hands are needed for other tasks, e.g. maintenance tasks.

EP 1134491 A2 discloses a gazing point illuminating device with a light source, a direction changing mechanism for changing the lighting direction of the light source, a gazing direction detector for detecting the direction of the user's gazing line and a controller for changing the lighting direction corresponding to the detected gazing direction. When, LEDs are used as the light source and the light source is attached to the goggles worn by a user, the goggles can be useful gazing point illuminating device by themselves, even if they do not include gazing point or direction detectors, because a person normally look straight ahead except for unusual occasions where he/she purposefully avert his/her gaze. In an embodiment an LED panel is provided at the left and right ends of goggles.

SUMMARY OF THE INVENTION

The present invention seeks to provide a system that facilitates the hands-free configuration of a luminous distribution in a field of view of such a user.

The present invention further seeks to provide a method of controlling such a system.

The present invention yet further seeks to provide a computer program product comprising computer program code for implementing such a method when executed on a processor of such a system.

According to an aspect, there is provided a system comprising a head-mountable eye tracking sensor, a processor coupled to said eye tracking sensor and at least one light source under control of said processor, wherein the at least one light source is arranged to generate a configurable luminous distribution into a field of view of the wearer of the eye tracking sensor; and the processor is adapted to configure said luminous distribution in response to eye tracking data obtained from said eye tracking sensor.

The present invention is based on the insight that eye tracking data such as at least one of pupillary response, direction of gaze, degree of focus and degree of squinting, i.e. eye closure, for example, can be used as an indicator of a luminous distribution in the field of view of the wearer of the eye tracking sensor may require adjustment. Consequently, by tracking the eye(s) of the wearer, information concerning the quality of the illumination conditions in the field of view of the wearer can be determined and used to control one or more light sources to configure the luminous distribution in the field of view of the wearer in a hands-free manner.

In an embodiment, the at least one light source comprises a deformable beam shaping element for producing said configurable luminous distribution in response to the eye tracking data. For instance, such a deformable beam shaping element may be used to switch the light source from a broad beam to a narrow beam or vice versa in order to adjust the luminous distribution in accordance with the eye tracking data.

The at least one light source may comprise a plurality of spatially separated light sources for configuring the luminous distribution. Different light sources of said plurality may be arranged to produce different beam shapes in order to create different luminous distributions by actuating different light sources of said plurality. For instance, the processor may be adapted to select at least a subset of said plurality of light sources in response to said eye tracking data in order to achieve a desired luminous distribution into said field of view by actuating said selection of light sources. In such an embodiment, the luminous distribution may be configured using light sources that individually produce a non-configurable luminous output, but wherein the luminous distribution may be configured by forming different combinations of such light sources.

The light sources may be spatially distributed in defined locations within a space, the system further comprising an image sensor for capturing an image of the field of view, wherein the processor is adapted to analyze data from said image sensor to recognize a location within said space from said field of view; and select the at least a subset of said plurality of light sources based on the recognized location. In this embodiment, the light sources do not need to be aligned with the field of view of the wearer of the eye tracking sensor but instead may form part of a light system having awareness of e.g. the location of objects within the space and the positioning of the light sources relative to such locations, such that the appropriate light sources may be selected to configure the luminous distribution in the field of view of the wearer.

Alternatively, the system may comprise a head-mountable device comprising the head-mountable eye tracking sensor and the at least one light source aligned with at least a part of said field of view such that the luminous distribution may be configured without requiring separate light sources. This increases the flexibility and applicability of the system. The head-mountable device may be a head-mountable computing device further comprising the processor to provide a self-contained wearable system.

In an embodiment, the at least one light source includes an infrared light source and the system further comprises at least one head-mountable display module under control of said processor; and an infrared image sensor adapted to detect infrared light in said field of view, wherein the processor is adapted to convert data from said infrared image sensor into a visible image of said field of view for displaying on said at least one head-mountable display module. This for instance allows the visualisation of the field of view of the wearer of the head-mountable display module in particularly challenging light conditions, where the wearer may choose to visualise the field of view using the infrared light source, for instance to create a night vision image or a thermal image on the at least one head-mountable display module.

The system may further comprise a light sensor for detecting visible light, wherein the processor may be adapted to actuate the infrared light source upon the light sensor producing a signal indicative of visible light levels in said field of view being below a defined threshold. This allows for the automatic generation of such a night vision image or thermal image on the at least one head-mountable display module when lighting conditions in the field of view of the wearer are particularly challenging, e.g are below a defined threshold.

In yet another embodiment, the system further comprises a distance gauging sensor for gauging a distance to an object in said field of view, wherein the processor is adapted to configure said luminous distribution in response to said eye tracking sensor and said distance gauging sensor. This for instance has the advantage that upon detection of an object of interest, as determined from the eye tracking data, the distance gauging sensor may be used to create a focused light beam on the object, which for instance may be useful if the wearer wants to switch from finding the object, which typically requires a broad field of view, to performing maintenance on the object, which typically requires a narrow field of view.

Alternatively or additionally, the system may further comprise an input sensor for detecting a user input, wherein the processor is adapted to further configure said luminous distribution in response to said user input. Such an input sensor may for instance be a touch sensor forming part of the user interface, and audio sensor for detecting spoken instructions, a movement sensor such as an accelerometer or gyroscope for detecting head movement, and so on. The user input may for instance comprise an instruction for reconfiguring the luminous distribution, which for instance may be desirable if the wearer wants to decide when to switch between different luminous distributions.

In accordance with another aspect, there is provided a method of controlling a system according to one or more of the above embodiments, the method comprising receiving eye tracking data from said eye tracking sensor on said processor; processing the eye tracking data on said processor; and generating a luminous distribution control signal with said processor for said at least one light source as a function of the processed eye tracking data. Such a method may be used to control the system according to embodiments of the present invention.

In accordance with yet another aspect, there is provided a computer program product comprising a computer-readable medium embodying computer program code for implementing the steps of the above method when executed on the processor of the system according to any of the above embodiments.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
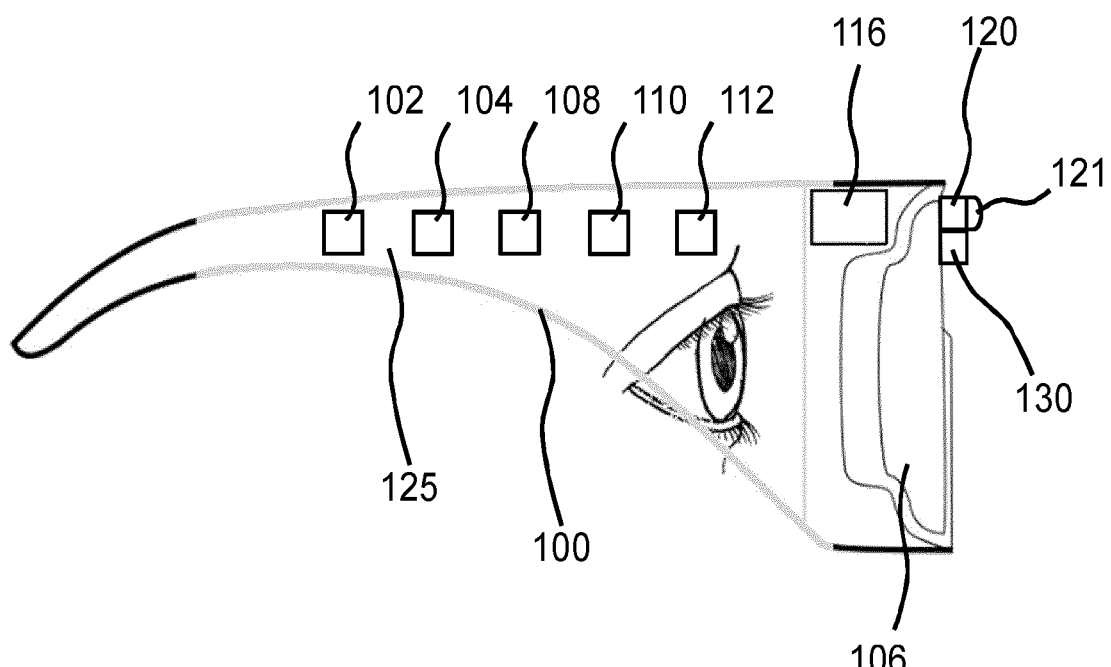
FIG. 1 schematically depicts a system according to an embodiment.

It should be understood that the Figures are merely schematic and are not drawn to scale. It should also be understood that the same reference numerals are used throughout the Figures to indicate the same or similar parts.

Embodiments of the present invention relate to a system in which the luminous output of one or light sources can be configured in response to eye tracking data from a head-mountable eye tracking sensor to be worn by a user of the system. This user will also be referred to as the wearer.

In some embodiments, the system is a wearable system including the one or more light sources. Such a wearable system may be a modular system wherein, in addition to the head-mountable eye tracking sensor, different parts of the modular system may be worn on different parts of the body of the wearer, e.g. on the arms or legs or around the waist of the wearer, within a garment worn by the wearer and so on, wherein different modules of the modular system are communicatively coupled to each other in a wired or wireless fashion. In an embodiment, the wearable system may be a head-mountable computing device in which all components of the system are mounted on the head of the wearer when in use.

In some alternative embodiments, at least the one or more light sources of the system may not be wearable but may instead be external to the wearable components of the system. For instance, the one or more light sources may be attached to a vehicle that may be controlled by the wearer, wherein the one or more light sources are arranged to project light into the field of view of the wearer when controlling the vehicle. Alternatively, the one or more light sources may be distributed in known locations across a space in which the wearer is present, wherein detection of such locations or information linked to such locations in a field of view of the wearer can be used to configure the light sources to produce the desired luminous output in the field of view.

In the context of the present application, a head-mountable computing device is a device that can be worn of the head of its user and provides the user with computing functionality. The head-mountable computing device may be configured to perform specific computing tasks as specified in a software application (app) that may be retrieved from the Internet or another computer-readable medium. Non-limiting examples of such head-mountable computing devices include smart headgear, e.g. eyeglasses, goggles, a helmet, a hat, a visor, a headband, or any other device that can be supported on or from the wearer's head, and so on.

FIG. 1 schematically depicts an embodiment of the system 100 in the form of such a head-mountable computing device. The head-mountable computing device 100 comprises an eye tracking sensor 116 for tracking eye movement of the wearer of the head-mountable computing device. The eye tracking sensor may track at least one of focus and gaze direction, which may be determined by tracking pupil size and orientation, as is well-known per se. Alternatively or additionally, the eye tracking sensor 116 may be arranged to detect the degree of opening of the eyes of the wearer, i.e. the degree of squinting, as such squinting may indicate the wearer struggling to identify an object or feature in his field of view, which may be an indication of non-optimal luminous conditions in the field of view or alternatively may be interpreted as the user consciously or subconsciously indicating a particular luminous configuration; for instance, the degree of squinting may indicate a desired beam angle, with a higher degree of squinting requiring a narrower or wider beam angle. Any suitable eye tracking sensor may be used for this purpose; as many different eye tracking sensors are well-known per se, see for instance WO 2011/106798 A1 by way of non-in the example, the eye tracking sensor 116 will not be explained in further detail for the sake of brevity only.

The eye tracking sensor 116 is communicatively coupled to a processor 110 for processing the sensor data of the eye tracking sensor 116. In an embodiment, the eye tracking sensor 116 may be arranged to perform some pre-processing on the sensor data, such that the eye tracking sensor 116 provides the processor 110 with eye tracking information that may be used by the processor 110 to configure a luminous distribution as will be explained in more detail later. Alternatively, the eye tracking sensor 116 may be arranged to provide the processor 110 with raw sensor data, which is processed by the processor 110 to derive the eye tracking information from the raw data.

The system 100 further comprises at least one light source 120 communicatively coupled to the processor 110 for generating a configurable luminous distribution in response to control signals provided by the processor 110 in response to the eye tracking data. The at least one light source 120 may be any suitable light source, e.g. one or more solid state elements such as LEDs. In case of a single light source 120, the light source 120 typically comprises a configurable beam shaping element 121 responsive to the processor 110 for altering the beam shape produced by the light source 120. Such a configurable beam shaping element 121, e.g. a configurable lens element such as a deformable lens, may by way of non-limiting example be implemented by an electro-active polymer lens or any other suitable beam configuration element. Such configurable beam shaping elements are well-known per se and will therefore not be described in further detail for the sake of brevity only.

In case of the system 100 comprising a plurality of light sources 120, the light sources 120 may be arranged to direct their respective luminous outputs into different parts of the field of view of the wearer such that the luminous distribution in the field of view may be configured by the selection of different subsets of the light sources 120. For instance the light sources 120 may be placed under different angles with an optical axis of said field of view to facilitate the creation of a configurable beam angle by selection of different subsets of the light sources 120. Alternatively or additionally, at least some of the light sources 120 in such an embodiment may comprise a configurable beam shaping element 121 to provide a further degree of control over the luminous distribution to be created in this field of view.

In an embodiment, the one or more light sources 120 may offer the ability to shape a luminous distribution broadly or narrowly along a particular axis. This for instance may be used to form a luminous distribution that may correspond to a luminous distribution produced by a broken light fixture to be repaired, such as a fluorescent tube producing an ellipsoid luminous distribution, wherein the luminous distribution generated by the system 100 may assist in locating the broken light fixture.

In case the system 100 is to wirelessly communicate with different parts of the system or with components external to the system, the system 100 may optionally comprise a wireless communication interface 102 for wirelessly communicating with a remote target, such as a remote component of the system 100 or a component outside the system 100. Any suitable wireless communication protocol may be used for any of the wireless communication between the system 100 and the remote component, e.g., an infrared link, Zigbee, Bluetooth, a wireless local area network protocol such as in accordance with the IEEE 802.11 standards, a 2G, 3G or 4G telecommunication protocol, and so on.

The system 100 may optionally comprise a further wireless communication interface 104 for wirelessly communicating with a further remote system, e.g. a wireless LAN, through which the head-mountable computing device 100 may access a remote data source such as the Internet. Alternatively, the head-mountable computing device 100 may include one wireless communication interface that is able to communicate with the remote component(s) and a further remote target such as the further network. The processor 110 may further be adapted to control wireless communication interface 102 and, if present, wireless communication interface 104.

The system 100 may optionally comprise at least one head-mountable see-through or transparent display module 106, which may be controlled by the processor 110 or by a dedicated display controller (not shown) communicatively coupled to the processor 110. In some embodiments, the display module 106 is arranged to cover the field of view of the wearer, for instance by having a single display module 106 covering both eyes of the wearer by having a pair of display modules 106 each covering one of the eyes of the wearer. As will be explained in more detail later, the at least one display module 106 may be used to display a thermal image or night vision image of the field of view of its wearer.

The system 100 may optionally comprise a user interface 108 for receiving input from the user. User interface 108 may include, for example, a touchpad, a keypad, buttons, a microphone, and/or other input devices. The processor 110 may control at least some of the functioning of head-mountable computing device 100 based on input received through user interface 108.

The system 100 may optionally comprise data storage 112 for the processor 110, e.g. a suitable type of memory, which data storage 112 may be used to store computer program code for execution by the processor 110.

Figure 2:
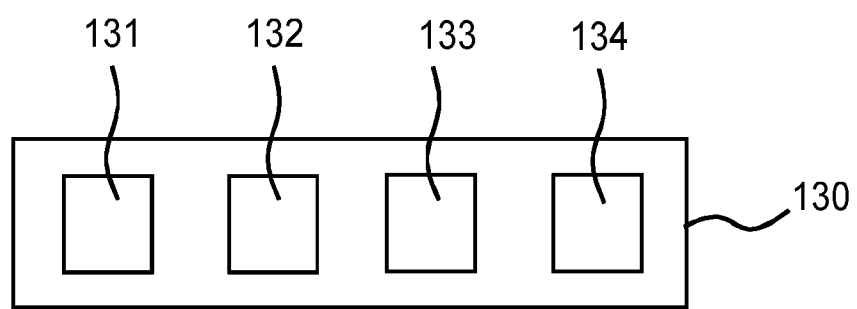
FIG. 2 schematically depicts a detail of the system of FIG. 1.

The system 100 may optionally comprise a sensor arrangement 130 including one or more sensors that enhance the functionality of the system 100. An example embodiment of a sensor arrangement 130 is shown in FIG. 2, in which the sensor arrangement 130 comprises four sensors by way of non-limiting example. It is furthermore noted that the sensors of the sensor arrangement 130 are placed in an array in FIG. 2 by way of non-limiting example only and that any suitable layout of such sensors within the system 100 may be contemplated.

In FIG. 2, the sensor arrangement 130 includes a light sensor 131, which may be implemented in any suitable manner, e.g. a photodiode or the like. The sensor arrangement 130 further includes an image sensor 132 for capturing an image of the field of view of the wearer, which image sensor 132 may form part of a camera. The image sensor 132 may be arranged such that when the image sensor forms part of a head-mountable computing device and the head-mountable computing device is worn as intended, the image sensor 132 aligns with the eyes of its wearer, i.e. produces a forward-facing sensor signal corresponding to the field of view of its wearer. Any suitable image sensor may be used for this purpose.

The sensor arrangement 130 may further include one or more movement sensors 133, e.g. one or more accelerometers and/or gyroscopes or the like, which may be used to capture head movement of the wearer, for instance to interpret such a head movement as an instruction as is well-known per se. Any suitable type of movement sensor may be used for this purpose. For instance, the system 100 may be configured to recognize a predefined head movement such as a shake or nod of the head of the wearer as an instruction to reconfigure the luminous distribution in his field of view. This for instance may be useful in a scenario where the system 100 has configured the one or more light sources 120 to produce a spatially broad luminous distribution based on the eye tracking data, which is spatially broad luminous distribution has enabled the wearer to identify an object in the field of view at which the wearer wants the luminous distribution to focus, for instance to perform maintenance task on the object, which may be signalled by such a head movement. Alternatively, for instance upon completion of such maintenance task, the wearer may want to reconfigure a narrow luminous distribution to a broad luminous distribution, which again may be triggered by such a head movement.

It should however be understood that such a reconfiguration instruction issued by the wearer may be issued in any suitable shape or form, e.g. as an audible instruction such as a spoken instruction or a predetermined sound such as a whistle, which for instance may be captured by a microphone (not shown) of the system, a gesture-based instruction, which for instance may be captured by the image sensor 132 and recognized by the processor 110 when processing the data captured by the image sensor 132, a tactile instruction by the wearer interacting with the user interface 108, and so on.

The sensor arrangement 130 may further include a distance sensor 134, which for instance may be implemented by one or more ultrasound transducers, for gauging a distance between the system 100 and an object in the field of view of the wearer. Such a distance sensor for instance may be used to gauge a distance from the system 100 to a particular part of the field of view of the wearer, such as an object in the field of view, which gauged distance may be used by the processor 110 to reconfigure the luminous distribution produced by the one or more light sources 120 in order to maintain a focused illumination on this particular part of the field of view. In other words, in this embodiment the luminous distribution may be adjusted as a function of the distance between the system 100 and this particular part of the field of view.

It should be understood that any combination of the aforementioned optional components of the system 100 may be chosen to define a system 100 according to an embodiment of the present invention. Furthermore, the various components of the system 100 may be placed within the system 100 in any suitable location; for instance, at least some of the compartments may be mounted on or housed in a support frame 125 of the system 100 including a head-mounted computing device, as shown in FIG. 1.

Figure 3:
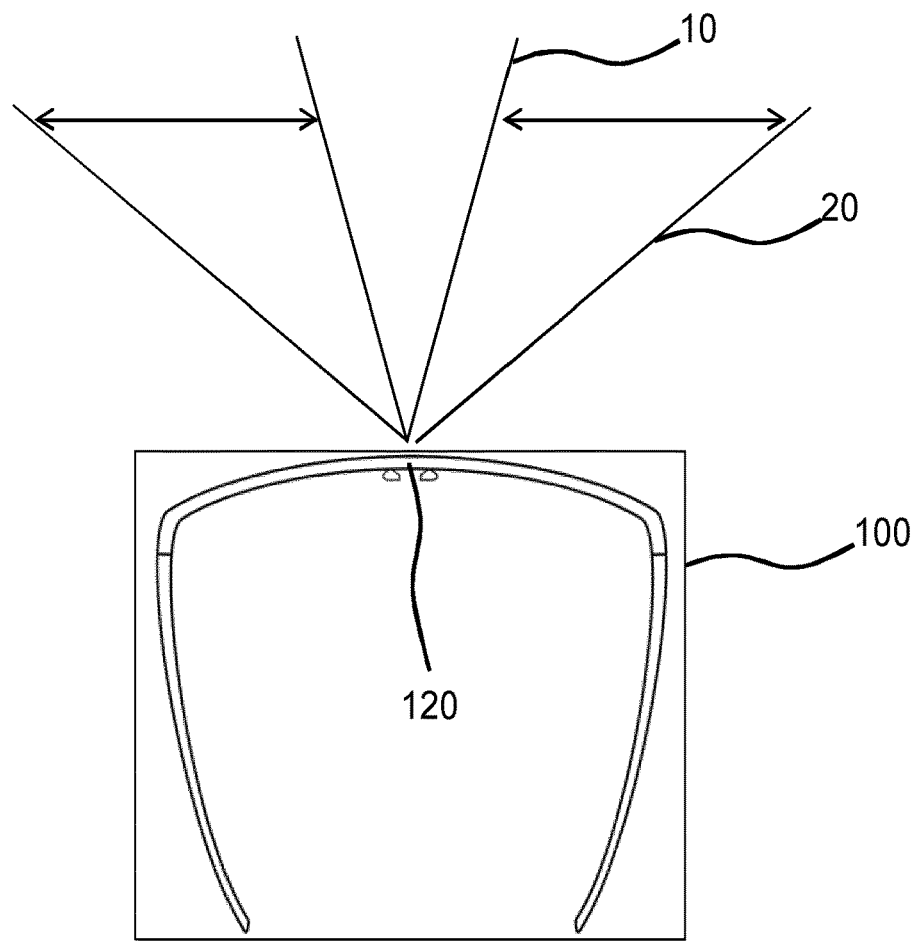
FIG. 3 schematically depicts a configurable luminous distribution generated with a system according to an embodiment.

FIG. 3 schematically depicts the reconfiguration of a luminous distribution, here a beam shape, using the system 100 according to an embodiment. In this embodiment, the luminous distribution produced by the one or more light sources 120 may be toggled between the first configuration 10 and a second configuration 20 based on eye tracking information provided by the eye tracking sensor 116. However, as explained already above, more elaborate reconfiguration of the luminous distribution is equally feasible, in particular when the system 100 comprises a plurality of light sources 120. Moreover, upon the initial configuration of the luminous distribution in response to the eye tracking information, the luminous distribution may be reconfigured by the user using an appropriate instruction as previously explained.

Figure 4:
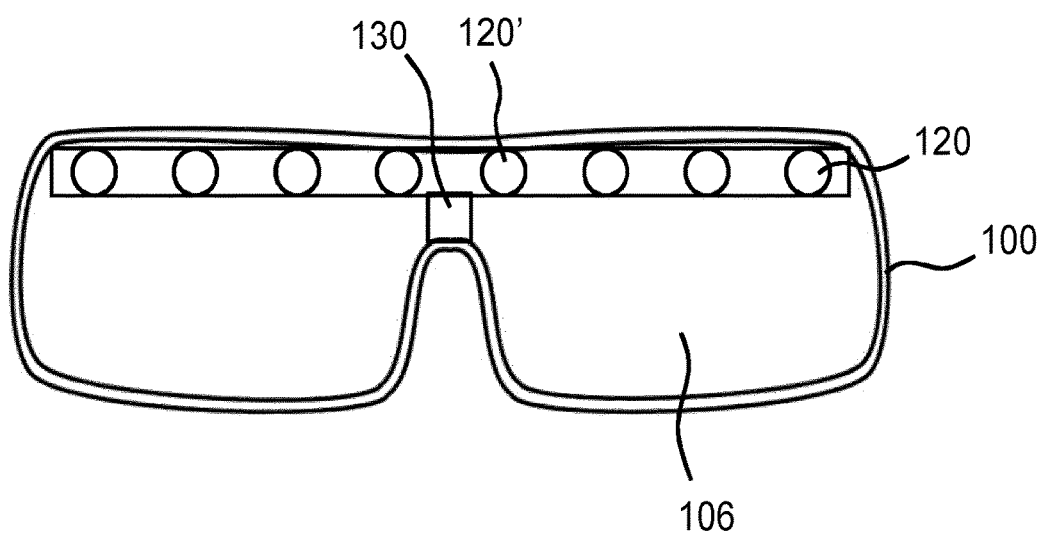
FIG. 4 schematically depicts a system according to another embodiment.

FIG. 4 schematically depicts a system 100 according to another embodiment, in which the system 100 is schematically depicted as a head-mountable computing device by way of non-limiting example. Again, it is equally feasible that the system 100 is a modular system in which the various modules are wearable modules or wherein at least some of the modules are not wearable.

In FIG. 4, the system 100 comprises one or more light sources 120 and one or more light sources 120' arranged to direct their respective luminous outputs into a field of view of the wearer of at least the eye tracking sensor 116. The one or more light sources 120 are arranged to produce visible light, i.e. light predominantly having wavelengths in the range of 400-700 nm, and the one or more light sources 120' are arranged to produce (near-) infrared light, i.e. light predominantly having wavelengths in the range of 700-1,000 nm. Each of the one or more light sources 120 and the one or more light sources 120' may be arranged to produce its luminous output in a unique direction, and may optionally comprise a configurable beam shaping element 121 as previously explained.

In this embodiment, the sensor arrangement 130 at least comprises a sensor for determining a light intensity in the field of view of the wearer, such as the light sensor 131 and a sensor for capturing an image of the field of view, such as the image sensor 132. Both the light sensor 131 and the image sensor 132 may be present in the sensor arrangement 130; alternatively, the image sensor 132 may be arranged to determine the light intensity as well as capture the image of the field of view. The image sensor 132 is at least capable of capturing an image in an infrared part of the electromagnetic spectrum, e.g. at least is sensitive to wavelengths ranging from 700-1,000 nm. In a preferred embodiment, the image sensor 132 is sensitive to both the visible and infrared part of the electromagnetic spectrum, e.g. at least is sensitive for wavelengths ranging from 400-1,000 nm.

In an embodiment, the wearer may configure the system 100 to engage either the one or more visible light sources 120 or the one or more infrared light sources 120' or to engage both the one or more visible light sources 120 and the one or more infrared light sources 120'. The wearer may select this configuration in any suitable manner, e.g. by providing the system 100 with a suitable instruction such as a head movement, gesture, spoken instruction, tactile instruction and so on. The thus engaged light sources may subsequently be configured based on the eye tracking data produced by the eye tracking sensor 116 (not shown in FIG. 4) in order to configure the luminous distribution as previously explained, e.g. by selecting specific subsets of the engaged light sources and/or to actuate specific configurable beam shaping elements 121 of selected light sources 120 and/or 120'. In case of the system 100 engaging the one or more infrared light sources 120', the image sensor 132 is typically configured to capture an image of the field of view of the wearer in the infrared part of the electromagnetic spectrum, which image is processed by the processor 110 or by another processor controlling the at least one display module 106 in order to generate a thermal image on night vision image of the field of view for display on the at least one display module 106.

In a particularly advantageous embodiment, the system 100 may be further configured to determine a light condition, e.g. a light intensity level, in the field of view of the wearer, e.g. using the light sensor 131 or the image sensor 132, wherein the system 100 may automatically engage the one or more infrared light sources 120' upon the determined light level falling below a predefined threshold indicating that visible light levels are becoming critically low. The visible light levels for instance may be determined based on the amount of reflected light from a luminous distribution, e.g. a light beam, formed by the one or more actuated visible light sources 120. The automatic engagement of the one or more infrared light sources 120' may be in addition to or alternative to the engagement of the one or more visible light sources 120.

Alternatively, the determined light condition may be used to switch from a default configuration in which the one or more infrared light sources 120' are used to create the configurable luminous profile to a configuration in which the one or more visible light sources 120 are actuated. Such a switch for instance may be user-controlled, e.g. by the wearer providing the system 100 with the appropriate instruction to activate the one or more visible light sources 120.

As previously mentioned, the system 100 may be provided as a wearable system, which may be a modular system, including the one or more light sources 120 or may alternatively be provided as a mixed modular system in which some components are wearable, such as the head-mountable eye tracking sensor 116, but in which other components may be separate from the wearer of the head mountable eye tracking sensor 116. For instance, the processor 110 may be an external processor that is communicatively coupled to the wearable parts of the system 100, such that at least some of the signal processing is performed external to the wearable parts of the system 100. This for instance has the advantage that the wearable part of the system 100 exhibit reduced energy consumption, which may improve the lifetime of a battery powering the wearable parts of the system 100.

Figure 5:
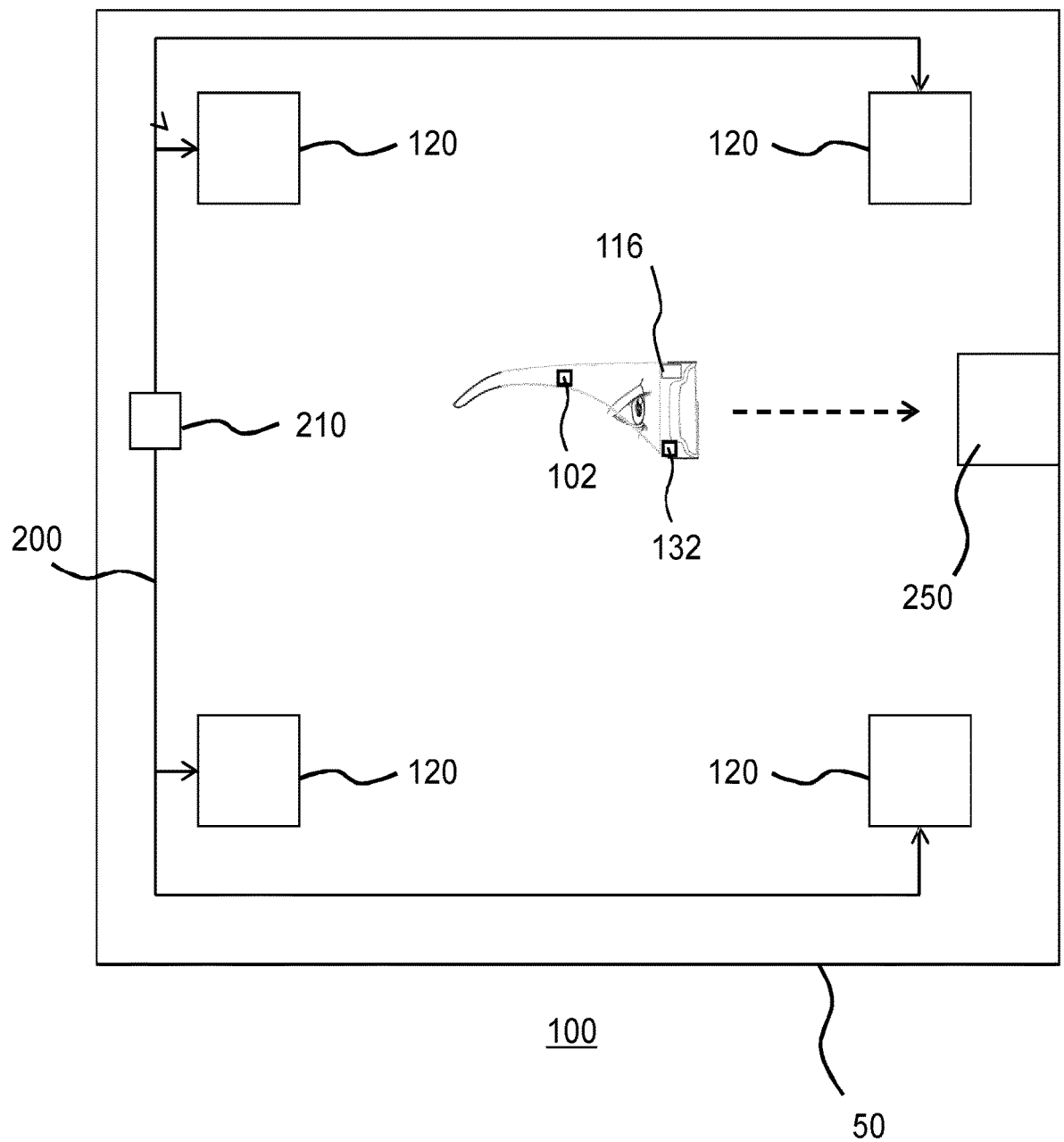
FIG. 5 schematically depicts a system according to yet another embodiment.

In an embodiment, such a mixed modular system 100 may comprise one or more light sources 120 that are external to the wearable parts of the system. This is schematically depicted in FIG. 5, in which the system 100 comprises a wearable component including the head-mountable eye tracking sensor 116 and at least one of the wireless communication interfaces 102 and 104 for wirelessly communicating with the other components of the system 100. The system 100 in this embodiment further comprises a networked lighting system 200 comprising a communication interface 210 and a plurality of light sources communicatively coupled to the communication interface 210. The communication interface 210 in some embodiments may comprise the processor 110. This is not shown in FIG. 5. The communication interface 210 is typically arranged to provide control signals to the light sources 120 in response to communications with the head-mountable eye tracking sensor 116 in order to configure the luminous distribution produced by the light sources 120 as previously explained.

In an embodiment, the light sources 120 may be arranged in a fixed relationship to the field of view of the wearer of the modular component including the head-mountable eye tracking sensor 116. This for instance is applicable if the wearer is more or less stationary within a space 50 comprising or supporting the light sources 120. For instance, the space 50 may be a vehicle such as a car or a flying machine such as a plane or helicopter, in which the user is typically stationary when operating the vehicle or flying machine and has his field of view in a relatively constant orientation, e.g. through the windscreen of the vehicle or flying machine. In this embodiment, the light sources 120 may be arranged to produce a luminous output into at least a part of this field of view, wherein the luminous distribution in this field of view may be configured by selecting specific subsets of the light sources 120 in response to the eye tracking information generated by the eye tracking sensor 116. For instance, the light sources 120 may be arranged in the body or on the roof of the vehicle or flying machine, wherein each light source may be arranged to produce its luminous output in a unique direction as previously explained for the embodiment shown in FIG. 4. Such an arrangement of light sources 120 having a more or less fixed relationship with the field of view of the wearer may for instance assist the wearer in performing surveillance tasks wherein the wearer focuses from time to time on specific aspects in his field of view, in which the luminous output produced by the light sources 120 may be configured to focus on such specific aspects in response to the eye tracking information generated by the eye tracking sensor 116.

In an alternative embodiment, the light sources 120 may form part of a networked lighting system 200 having light sources 120 distributed over a space 50 and communicatively coupled to the communication interface 210, wherein the lighting system 200 and the head-mountable eye tracking sensor 116 mounted on a head-mountable device form separate parts of the system 100. The head-mountable device further comprises an image sensor 132 for capturing an image of the field of view of the wearer and at least one of the wireless communication interfaces 102 and 104 for wirelessly communicating with the other components of the system 100, in particular with the communication interface of the lighting system 200. The wireless communication interface may be configured to communicate the image data captured with the image sensor 132 to the lighting system 200 for further processing on a processor of the lighting system 200, which processor for instance may be included in a communication interface 210 or may be included in any other suitable part of the lighting system 200. Alternatively, the head-mountable device includes the processor 110 for processing the image data captured by the image sensor 132, in which case the wireless communication interface 102 (or 104) may communicate the processing result to the lighting system 200.

The lighting system 200 is arranged to analyze the image of the field of view as captured by the image sensor 132 in order to identify a location of the head-mountable device including the eye tracking sensor 116 within the space 50. This location may for instance be derived from the recognition of an object 250 in the image combined with the eye tracking sensor information from the eye tracking sensor 116, which for instance may give an indication of a distance of the wearer from the recognized object, e.g. from the eye focus information derived from the eye tracking information and/or may give an indication of an angle under which the wearer is looking at the object, e.g. from pupil location in the eye derived from the eye tracking information.

In this embodiment, the lighting system 200 is aware of the location and orientation of each of the light sources 120, in particular the direction in which the light sources 120 produce their respective luminous outputs. Consequently, upon receiving the eye tracking information from the eye tracking sensor 116 and the image data from the image sensor 132, the lighting system 200 can select an appropriate light sources 120 that generate an appropriate luminous distribution into the field of view of the wearer based on the location of the wearer as determined from the image data and eye tracking information, whereas changes in the location, for instance as determined from a further image captured by the image sensor 132, distanced data and/or eye tracking information may trigger the reconfiguration of the luminous distribution by the lighting system 200 by the selection of a different subset of light sources 120 and/or reconfiguration of the luminous output of selected light sources 120 by the aforementioned control of the configurable beam shaping element 121 if present on such light sources.

In an embodiment, at least some of the light sources 120 may have an adjustable luminous output direction, e.g. may be movably mounted within the space 50, wherein a controller of the appropriate light source 120, which may be a central controller or a controller dedicated to the appropriate light source may adjust the direction in which the light source 120 produces its luminous output in order to more accurately align this luminous output with the object 250 within the field of view of the wearer.

Figure 6:
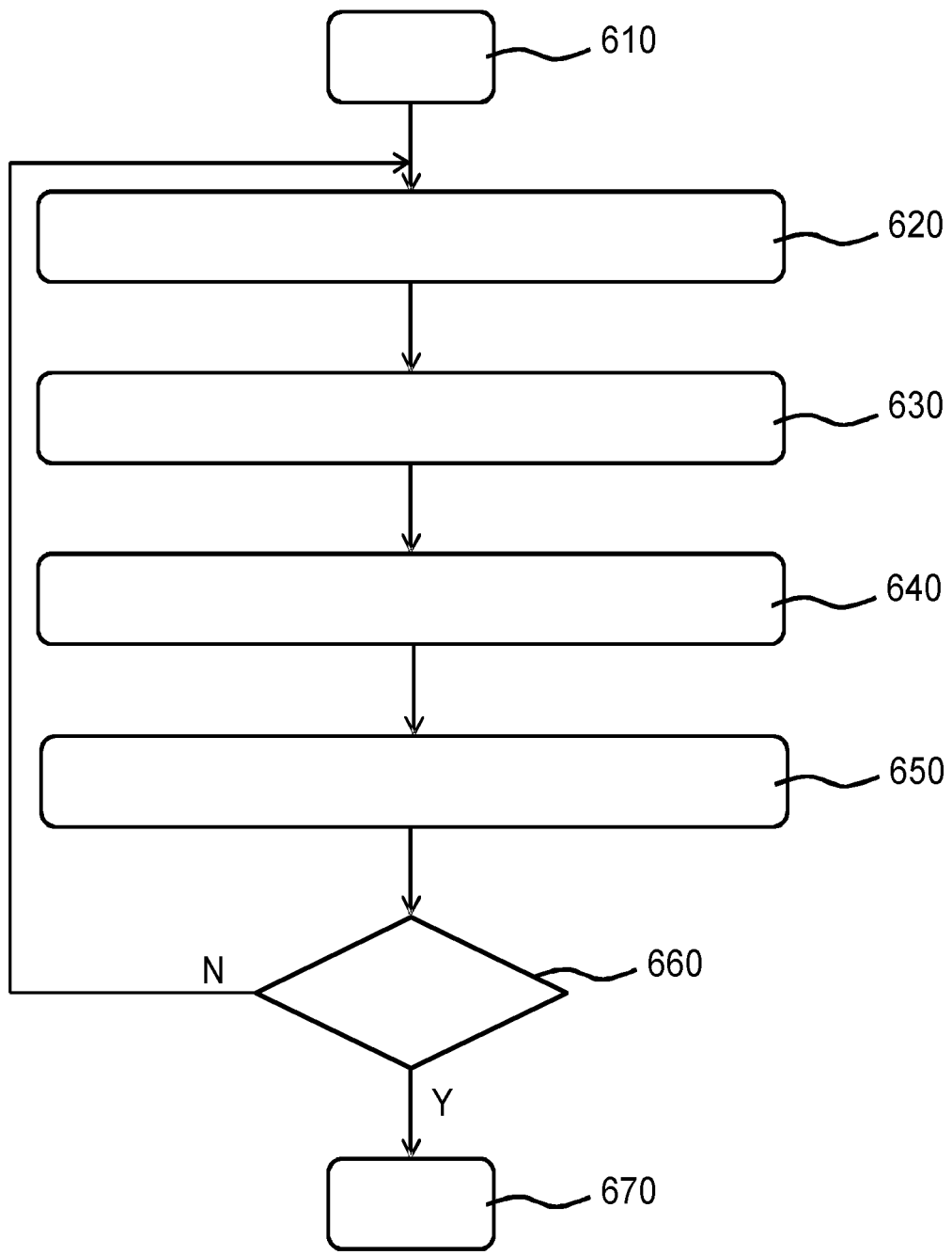
FIG. 6 depicts a flowchart of a method of controlling a system according to an embodiment.

FIG. 6 is a flow chart of a method 600 of controlling the system 100 in accordance with an embodiment. The method 600 starts in step 610, for instance by initializing the system 100, after which the method proceeds to step 620 in which the eye tracking information is generated by the eye tracking sensor 116. The eye tracking information is processed by processor 110, which may be an integrated processor of a wearable system 100 or may be a processor that is external to the wearable parts of the system 100, for instance a processor of a lighting system 200 or of any other system that is communicatively coupled to the system 100, e.g. through wireless communication interface 102 and/or 104.

As previously explained, the eye tracking information is processed in order to derive information for controlling one or more light sources 120 of the system 100 in order to configure the luminous output of the system 100 as previously explained. In step 640, a light source adjustment signal is generated and provided to the appropriate one or more light sources 120, which one or more light sources are adjusted in step 650 in accordance with the provided adjustment signal in order to configure the luminous output in accordance with the obtained eye tracking information.

In step 660 it is checked if the system 100 should continue to track the eyes of the wearer of the head-mountable eye tracking sensor 116 such that the system 100 may continue to adjust the luminous output produced by the system 100 in accordance with updated eye tracking information. If this is the case, the method 600 refers back to step 620. Otherwise, the method 600 terminates in step 670.

Based on the foregoing description of the various embodiment of the present invention, it will be apparent that this method 600 may be extended in accordance with these various embodiments. For example, upon configuring the luminous output of the system 100, the method may further comprise obtaining distance information using distance gauging sensor(s) 134 to further configure the luminous output produced by the system 100 in accordance with the obtained distance information.

For instance, as explained above, the light sources may be further adjusted in response to obtained light conditions with the light sensor 131 or the image sensor 132 in order to enable infrared light sources 120' and generate a thermal image or night vision image on the at least one display module 106 of the system 100 from imaging data captured with the image sensor 132 in the field of view of the wearer, which field of view is at least in part illuminated by the one or more enabled infrared light sources 120'.

For instance, as explained above, the light sources may be further adjusted in response to a user command in order to reverse or otherwise adjust the luminous distribution configured in response to the eye tracking information.

Other possible extensions to the method 600 will be apparent to the skilled person from the foregoing.

Aspects of the present invention may be embodied as a system, method or computer program product. The system may be partially wearable, i.e. may be a distributed system, or may be a fully wearable system, which may be worn on the head alone or on different parts of the body in case of a modular system in which different modules are communicatively coupled to each other in a wired or wireless fashion. Aspects of the present invention may take the form of a computer program product embodied in one or more computer-readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Such a system, apparatus or device may be accessible over any suitable network connection; for instance, the system, apparatus or device may be accessible over a network for retrieval of the computer readable program code over the network. Such a network may for instance be the Internet, a mobile communications network or the like. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present application, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out the methods of the present invention by execution on the processor 110 may be written in any combination of one or more programming languages, including an object oriented programming language such as Java, Smalltalk, C++ or the like and conventional procedural programming languages, such as the "C" programming language or similar programming languages. The program code may execute entirely on the processor 110 as a stand-alone software package, e.g. an app, or may be executed partly on the processor 110 and partly on a remote server. In the latter scenario, the remote server may be connected to the head-mountable computing device 100 through any type of network, including a local area network (LAN) or a wide area network (WAN), or the connection may be made to an external computer, e.g. through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions to be executed in whole or in part on the processor 110 of the system 100, such that the instructions create means for implementing the functions/acts specified in the flowchart and/or block diagram block or blocks. These computer program instructions may also be stored in a computer-readable medium that can direct the system 100 to function in a particular manner.

The computer program instructions may be loaded onto the processor 110 to cause a series of operational steps to be performed on the processor 110, to produce a computer-implemented process such that the instructions which execute on the processor 110 provide processes for implementing the functions/acts specified in the flowchart and/or block diagram block or blocks. The computer program product may form part of a system 100, e.g. may be installed on the system 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A system comprising a head-mountable eye tracking sensor on a head-mountable device, a processor coupled to said eye tracking sensor and a plurality of spatially separated light sources in locations within a space under control of said processor, wherein:
   at least one light source of the plurality of spatially separated light sources is external to the eye tracking sensor and arranged to generate a configurable luminous distribution into a field of view of the wearer of the eye tracking sensor, the light source of the plurality of spatially separated light source is adapted to produce a different beam shape;
   the system comprises an image sensor arranged on the head-mountable device for capturing an image of the field of view;
   the processor is adapted to configure said luminous distribution in response to eye tracking data obtained from said eye tracking sensor,
   wherein the processor is adapted to select at least a subset of said plurality of spatially separated light sources and the different beam shapes in response to said eye tracking data in order to achieve a desired luminous distribution into said field of view by actuating said selection of light sources; and
   the processor is adapted to analyze data from the image sensor to recognize a location based on data from the eye tracking sensor within the space from the field of view and select at least a subset of the plurality of light sources based on the recognized location.

2. The system of claim 1, wherein each light source from the plurality of spatially separated light sources is adapted to produce a non-configurable luminous output and wherein the desired luminous distribution is achieved by selecting at least a subset of the non-configurable luminous outputs.

3. The system of claim 1, wherein a degree of squinting indicates a desired beam angle.

4. The system of claim 1, the system further comprises:
   an infrared light source;
   at least one head-mountable display module under control of said processor; and
   an infrared image sensor adapted to detect infrared light in said field of view, wherein the processor is adapted to convert data from said infrared image sensor into a visible image of said field of view for displaying on said at least one head-mountable display module.

5. The system of claim 4, further comprising a light sensor for detecting visible light, wherein the processor is adapted to actuate the infrared light source upon the light sensor producing a signal indicative of visible light levels in said field of view being below a defined threshold.

6. The system of claim 1, further comprising a head-mountable device comprising the head-mountable eye tracking sensor,
the head-mountable device further comprising a sensor arrangement for capturing a head movement of a wearer of the head-mountable device, and
the processor further adapted to reconfigure the desired luminous distribution in the field of view based on the captured head movement.

7. The system of claim 6, wherein the processor is further adapted to reconfigure, by the selection of a different subset of light sources and/or beam shapes, the desired luminous distribution in the field of view based on the eye tracking data obtained from said eye tracking sensor.

8. A method of controlling a system according to claim 1, the method comprising:
receiving eye tracking data from said eye tracking sensor on said processor;
processing the eye tracking data on said processor to determine a field of view;
selecting at least a subset of said plurality of spatially separated light sources as a function of said processed eye tracking data in order to achieve a desired luminous distribution into said field of view; and
generating a luminous distribution control signal with said processor for actuating said at least one subset of said plurality of spatially separated light sources.

9. The method of claim 8, further comprising capturing an image of the field of view with the image sensor, wherein the processor is adapted to:
analyze the image from said image sensor to recognize a location within said space from said field of view; and
select the at least a subset of said plurality of spatially separated light sources based on the recognized location.

10. A computer program product comprising a non-transitory computer-readable medium embodying computer program code for implementing the steps of the method of claim 1 when executed on the processor of the system.

11. The system of claim 1, wherein the processor is adapted to select a subset of said plurality of spatially separated light sources and the different beam shapes in response to said eye tracking data.

* * * * *